(12) United States Patent
McGill

(10) Patent No.: US 9,092,821 B2
(45) Date of Patent: Jul. 28, 2015

(54) METHOD FOR ESTIMATING FLOWS BETWEEN ECONOMIC ENTITIES

(75) Inventor: Eric McGill, San Francisco, CA (US)

(73) Assignee: Ashbury Heights Capital, LLC, San Francisco, CA (US)

( * ) Notice: Subject to any disclaimer, the term of this patent is extended or adjusted under 35 U.S.C. 154(b) by 0 days.

(21) Appl. No.: 13/299,168

(22) Filed: Nov. 17, 2011

(65) Prior Publication Data

US 2013/0103553 A1     Apr. 25, 2013

Related U.S. Application Data

(60) Provisional application No. 61/549,592, filed on Oct. 20, 2011.

(51) Int. Cl.
| G07B 17/00 | (2006.01) |
| G07F 19/00 | (2006.01) |
| G06Q 40/00 | (2012.01) |

(52) U.S. Cl.
CPC ...................................... G06Q 40/00 (2013.01)

(58) Field of Classification Search
None
See application file for complete search history.

(56) References Cited

U.S. PATENT DOCUMENTS

| 7,478,071 | B2 | 1/2009 | Kadambe |
| 7,653,582 | B2 | 1/2010 | Costache et al. |
| 7,873,595 | B2 | 1/2011 | Singh et al. |
| 7,937,319 | B2 | 5/2011 | Kennis et al. |
| 2005/0262014 | A1 | 11/2005 | Fickes |
| 2007/0245035 | A1 | 10/2007 | Attaran Rezaei et al. |
| 2008/0082377 | A1 | 4/2008 | Kennis et al. |
| 2009/0070253 | A1 | 3/2009 | Gavin |
| 2009/0132448 | A1 | 5/2009 | Eder |
| 2009/0138307 | A1 | 5/2009 | Belcsak et al. |
| 2011/0173093 | A1* | 7/2011 | Psota et al. ................. 705/26.35 |

OTHER PUBLICATIONS

NPL_IPF_PARFUM, Techniques for Generic Probabilistic Inversion, Kurowicka and Cooke, Published in "Probabilistic Safety Assessment and Management", 2002, 7 pages. Downloaded on Jun. 27, 2013 from http://www.researchgate.net/publication/228737494_Techniques_for_generic_probabilistic_inversion?ev=prf_pub.*

* cited by examiner

*Primary Examiner* — Paul Danneman
(74) *Attorney, Agent, or Firm* — Mahamedi Paradice LLP

(57) ABSTRACT

In economic networks, it is not currently possible to observe all flows between entities. Only a portion of relationships between firms is known publicly, and only a portion of those relationships is assigned values through reporting requirements by the regulating public institutions. Therefore, obtaining a plurality of documents that describe companies and their known connections through public sources will necessarily result in an incomplete matrix of customer-supplier relationships containing some mixture of known relationships with known values, known relationships with unknown values, and unknown relationships with unknown values. A method and system is presented to obtain a best estimate of all unknown values given the known information in the network, including an amount that is assigned to unknown entities to be discovered later.

16 Claims, 4 Drawing Sheets

| Start Date | End Date | Supplier ID | Customer ID | Revenue % |
|---|---|---|---|---|
| 2010-03-03 | 4000-01-01 | 4384 | 20685 | 7 |
| 2010-12-01 | 4000-01-01 | 4384 | 22287688 | 15 |
| 2010-12-01 | 4000-01-01 | 4384 | 1880629 | null |
| 2010-12-01 | 4000-01-01 | 4384 | 2207 | 5 |
| 2010-12-01 | 4000-01-01 | 4384 | 1623602 | null |
| 2010-12-01 | 4000-01-01 | 4384 | 9783 | 12 |

FIGURE 1

|  | A | B | C | D | E | Consumer | Revenue |
|---|---|---|---|---|---|---|---|
| A |  |  | 10 |  | ? | ? | 100 |
| B | 9 |  | ? | 13 | 19 | ? | 100 |
| C | ? | 21 |  | ? |  | 14 | 100 |
| D | 4 |  |  |  |  | ? | 100 |
| E |  | 14 | ? |  |  | ? | 100 |
| Labor | ? | ? | ? | ? | ? |  | 100 |
| Cost | 100 | 90 | 80 | 70 | 60 | 200 |  |

| | |
|---|---|
| ## | known relationship & value |
| ? | known relationship only |
|  | unknown |

FIGURE 2

|       | A     | B     | C     | D     | E     | Consumer | Revenue |
|-------|-------|-------|-------|-------|-------|----------|---------|
| A     | 0.001 | 0.001 | 0     | 0.001 | 10    | 10       | 90      |
| B     | 0     | 0.001 | 10    | 0     | 0     | 10       | 59      |
| C     | 10    | 0     | 0.001 | 10    | 0.001 | 0        | 65      |
| D     | 0     | 0.001 | 0.001 | 0.001 | 0.001 | 10       | 96      |
| E     | 0.001 | 0     | 10    | 0.001 | 0.001 | 10       | 86      |
| Labor | 10    | 10    | 10    | 10    | 10    | 0.001    | 100     |
|       |       |       |       |       |       |          |         |
| Cost  | 87    | 55    | 70    | 57    | 41    | 186      |         |

FIGURE 3

|       | A      | B      | C      | D      | E      | Consumer | Revenue |
|-------|--------|--------|--------|--------|--------|----------|---------|
| A     |        |        | 10.000 |        | 40.949 | 49.051   | 100     |
| B     | 9.000  |        | 28.929 | 13.000 | 19.000 | 30.072   | 100     |
| C     | 40.730 | 21.000 |        | 24.270 |        | 14.000   | 100     |
| D     | 4.000  |        |        |        |        | 96.000   | 100     |
| E     |        | 14.000 | 41.024 |        |        | 44.976   | 100     |
| Labor | 46.270 | 55.000 | 0.047  | 32.730 | 0.051  |          | 134     |
|       |        |        |        |        |        |          |         |
| Cost  | 100    | 90     | 80     | 70     | 60     | 234      |         |

FIGURE 4

|   | A | B | C | D |
|---|---|---|---|---|
| A | - |   |   |   |
| B | 2 | - |   | 4 |
| C |   |   | - |   |
| D |   | 6 |   | - |

METHOD FOR ESTIMATING FLOWS BETWEEN ECONOMIC ENTITIES

RELATED APPLICATION (PRIORITY CLAIM)

This application claims the benefit of U.S. Provisional Application Ser. No. 61/549,592, filed Oct. 20, 2011, which is hereby incorporated herein by its entirety.

FIELD OF THE INVENTION

An embodiment of the present invention relates generally to techniques used to statistically estimate unknown or unobserved data between entities for a given point in time, and more specifically relates to a method for generating estimates of flows between nodes in an economic network as discovered by a plurality of sources.

BACKGROUND OF THE INVENTION

An embodiment of the present invention provides a method for generating estimates of flows between nodes in an economic network as discovered by a plurality of public and private sources (i.e., United States Security and Exchange Commission (SEC) documents and filings, press releases, company presentations, websites, interviews, analyst estimates, etc. and their foreign equivalents), seeking to specify a value over a specific timeframe for the interaction between each pair of economic entities. These entities can be interpreted to be general actors in a network, whether that is companies, firms, divisions, persons, sectors, etc. as long as reasonably and functionally equivalent units are used for each entity. Similarly, the flows between entities can be interpreted as general interactions between entities, whether that is goods, services, monies, information, economic traffic, dollars, euros, etc. as long as the unit chosen provides a meaningful measure of relative comparison. While the present disclosure is focused on financial relationships between global companies, the present invention can take many forms and can be configured to apply to a wide range of situations and to a wide range of applicable entities.

Due to the private nature of many economic activities and limited public record requirements, full access to customer, supplier, debtor, creditor, partner, distributor, etc. agreements is not generally possible. For example, in the United States, the SEC currently only requires companies to disclose any relationships that comprise more than 10% of their revenue in a given reporting period. This places an analyst in the position of having summary statistics from the network with only a partial view into the network's details and the relative magnitude of an entity's interaction with its neighbors.

However, most of the network analytics that would be useful in establishing the importance of an entity require a complete characterization of the internal network, meaning that each relationship should have a value assigned to it. This is true for all measures of advanced analysis such as centrality measurements, including eigenvector, closeness, betweenness, weighted degree, etc. Only a very small subset of network statistics can be completed with binary relationship information, and those would be largely static since binary economic relationships do not tend to change on a daily or monthly basis.

SUMMARY OF THE INVENTION

An embodiment of the present invention provides a method for estimating flows between entities in an economic network in order to complete or more fully populate and characterize the network, while only having access to limited information about the relationships between the entities.

BRIEF DESCRIPTION OF THE DRAWINGS

The organization and manner of the structure and operation of an embodiment of the present invention may best be understood by reference to the following description, taken in connection with the accompanying drawings, wherein:

FIG. 1 illustrates a table, specifically an example list of customer-supplier relationships with partial flow information;

FIG. 2 illustrates an initial matrix showing known and unknown data;

FIG. 3 illustrates an intermediate matrix after seed estimates but before convergence;

FIG. 4 illustrates a final matrix with all cleanup operations complete;

DESCRIPTION

Figures 5, 6:
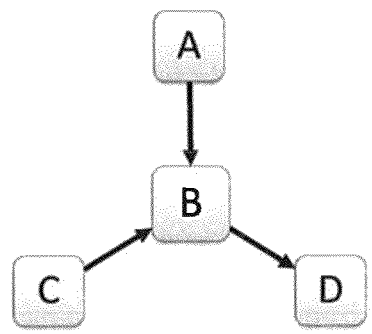
FIG. 5 illustrates a simple representative diagram of an economic network.
FIG. 6 illustrates a simple matrix corresponding to the simple diagram shown in FIG. 5.

While the invention may be embodied in different forms, there are shown in the drawings, and herein will be described in detail, specific embodiments of the invention. The present disclosure is to be considered an example of the principles of the invention, and is not intended to limit the invention to that which is illustrated and described herein.

As discussed above, typically not all the economic data relating to entities is known or even obtainable. For example, in the United States, the SEC currently only requires companies to disclose any relationships that comprise more than 10% of their revenue in a given reporting period, although additional information is often available from other public sources or voluntary disclosures made by the companies. The present invention provides an estimation procedure that fills in missing information for unknown values of known relationships, unknown relationships, and unknown entities so that the economic network can be mapped, measured, and analyzed. An embodiment of the present invention provides a method for estimating flows between entities in an economic network in order to complete or more fully populate the network, while only having access to limited information about the relationships between the entities, such as marginal row and column totals and partial information about the interior relationships. The typical underlying data for this process is a composite of public financial sources, covering reported revenue and cost accounting totals, supplier revenue percentages, and industry classifications. While the present method was specifically developed for use in estimating economic activity between companies, the same techniques would be applicable and meaningful for any general category of economic entities as long as the resolution and measurement is consistent across the network participants. By estimating values to characterize the complete internal matrix, more useful analytics are enabled and more complex calculations can be performed. These values will then reflect the fluidity of the network as it changes in response to economic activity that affects revenue, cost, or any other measure of relative interaction between entities, including the optional incorporation of current market valuations or equity price movements.

The estimation process is valid because economic networks can be described by the dynamics of discrete choice models in which the customer and supplier simultaneously choose to interact with each other. Although the details of each decision-making process remain unknown due to data and access limitations, it can be assumed that the base processes follow some version of a multinomial distribution (and likely a multinomial logit model) because the assumption of independence to irrelevant alternatives (IIA) holds, and the assumption regarding independent error distributions (IID) is likely to hold if more information were able to be gathered. Furthermore, substantial work has been done using multinomial logit models to explain individual consumer choice, so it is logical to assume that the decision process performed by the decision-makers at the corporate level should behave similarly as a first approximation. This assumption allows use of the probabilistic inversion procedures (such as the iterative proportional fitting (IPF) algorithm, the parameter fitting for uncertain models (PARFUM) algorithm, or similar) as the maximum likelihood estimator (MLE) for the underlying log-linear model without having to derive the choice model itself. Additional models can be used to converge the estimates, such as linear (or non-linear) programming with constraints or the expectation-maximization (EM) algorithm, but they will not guarantee a maximum likelihood estimate as an output. This leaves the probabilistic inversion models as the superior choice. For brevity, only a two-dimensional iterative proportional fitting procedure will be discussed in detail, although it is a trivial exercise to extend the IPF method to higher dimensions or replace IPF with PARFUM or another similar technique that also guarantees the MLE outcome.

In spite of its guarantee as a maximum likelihood estimate, the base IPF process as described in the literature cannot be applied without some significant modifications due to the limited data available from public sources. Known relationships with known values must be preserved by fixing their values, known relationships with unknown values must have seed estimates calculated, and unknown relationships with unknown values must be handled by small positive contributions that will subsequently be aggregated and assigned away after convergence. In addition, a dummy entity must be created to simultaneously play the role of the consumer & labor supply, a profit balancer for the companies, and all unknown entities. With these or similar components in place, the IPF will process converge stably in all cases and provide a base economic matrix for use in analytic calculations.

An embodiment of the present invention provides that the estimation procedure begins by collecting data from a plurality of public and private sources (e.g., SEC 10-K's, 10-Q's, press releases, company presentations, websites, interviews, analyst estimates, etc.) and their equivalents in order to build a starting network of known relationships between entities, some of which contain known values reflecting the relative amount of value transferred in the relationship. These relationships are stored in a database that minimally contains the source entity, destination entity, start date, end date, relationship type, and value (if known) for the interaction, creating a table that enables the known information about the network on any day to be queried. The data that is collected can comprise various types of data, such as but not limited to: data which tends to indicate qualified and unqualified relationships between entities, financial statements, accounting or industry types, financials by division, geography, market, product, or channel, and a variety of industry specific data.

Naturally, there is some latitude in the values destined for the network—an analyst may be more concerned with cash flows than revenue and cost, or they may weight the values in order to include additional information or the results of their proprietary analysis. Sample weightings could adjust the values for risk, volatility, market perception (multiples or recent price trends), etc. or smooth the values over a recent time window. An optimal place to apply any weighting will be addressed later in the description—especially if negative values are to be considered.

Assuming the present invention is being used in a financial application, preferably revenue is treated as the sum of all incoming monetary flows, and cost is treated as the sum of all outgoing flows. However, care must be taken to use the proper accounting category definitions (e.g., COGS, SG&A, Capital Expenditures, R&D, etc.), as they vary by industry, in order to obtain the correct totals of values leaving and entering the entity. In a more general network, the flows between entities could represent some abstract interaction, such as willingness to help, tendency to argue, friendliness, or cooperation. As long as these individual values are measured in a comparable way and matched with an appropriate aggregated total capacity, then the estimation process will not be affected. However, the estimation may not be valid as a best fit unless the network interactions can be reasonably assumed to follow a log-linear distribution that will converge to a best estimator.

The network information can be stored efficiently in a sparse format with each line or database row representing a single one-way relationship. A simple example is shown in the table shown in FIG. 1. As shown, when queried for a specific day, the network returns valid relationships in a sparse matrix format with the suppliers of goods and services (receiving funds or revenue) on the rows and the customer of goods and services (sending funds or cost) on the columns. The interior of the matrix is populated with the values if known, and placeholders if not known. Supporting data in the form of aggregated totals are also stored as the marginal totals for the matrix in order to be used as summation targets in the iterative process. Most often, these aggregated totals are not the sum of the rows and columns using just the known data; rather, they represent an independent target to be reached in the final estimation. For example, a firm with $1B in revenues may only have a handful of customers identified that comprise $700M in known revenue relationships. Of the $300M remaining, a portion will need to be allocated to other known relationships, and a portion reserved for unknown relationships or general consumer activity. Ultimately, a final solution in two dimensions requires the internal values of the matrix to sum to the column and row totals simultaneously within a specified margin of error or convergence target. Extending the procedure to higher dimensions would simply require the collection of additional marginal targets (such as revenue and cost by geography or product, etc.) so that the iterative probabilistic inversion algorithm will have an appropriate set of targets.

After determining the valid relationships at a specific time, a dummy entity must be created to perform the role of the unknown relationships. In the economic example, the dummy company simultaneously performs the roles of the consumer (as a buyer), the labor market (as a supplier), and any as-yet undiscovered entities. Revenues that do not come from other companies are allocated to the consumer, and costs that do not flow to another company are allocated to labor. Accounting-related categories like depreciation and amortization are excluded, as they do not represent a meaningful interaction with another entity. The dummy entity also plays a key role in balancing out the revenue and cost totals in the financial example. Since the vast majority of firms will be reporting some kind of profit, there is an inherent imbalance between the revenue and cost targets in a financial matrix. Ultimately, the source of this profit is the extraction of natural resources, but the most appropriate fix for analysis of a limited network is to have the consumer/labor supply provide the balancing flows by spending more than they earn.

With regard to the rationale for the approach used, economic networks are difficult to model because they violate many of the basic assumptions about the distribution of transactions that would simplify the modeling process. For example, telecommunication (or general communication) networks are often modeled using a Poisson distribution that assumes a known frequency of arrival of new information, independent from previous events in time. This is a reasonable assumption because it is very likely that one phone conversation is independent of another. Gaussian distributions are also used frequently in demographic studies because they accurately describe the natural variation in a population given independent samples from the same base. However, using either of these distributions in an economic context would require that transactions be independent across time and network participants, and that is not a safe assumption for customer-supplier relationships. Economic activity is very much predicated on the behavior of one entity as it relates to another, therefore making many of the assumptions of simple independence unrealistic. For this reason, a simple assumed distribution such as a Poisson typically should not be used as the basis of a likelihood estimator in order to seed the unknown relationships for the financial embodiment. There may be limited cases in which economic activity (such as customers arriving in a queue) could be described by a Poisson or other standard distribution, and the general steps of the estimation process would still apply in using the IPF algorithm to generate a maximum likelihood estimate. However, for the financial embodiment that covers customer-supplier relationships, a more general approach must be used.

Since the core of economics is choosing if/which product to consume, discrete choice analysis is a good platform upon which to base the analysis of an economic network. Each customer-supplier relationship is the result of a choice for that customer to buy from that supplier, simultaneous with the supplier's choice to sell to that customer. Both the customer and supplier have a specific choice set available to them, and they determine whom to work with based on a variety of attributes, such as price, distance, reliability, time to deliver, design, switching costs, etc. and their preference for those attributes. Mathematically, this model expresses the probability of choosing one distinct option over others as follows:

$$P(i \mid C_n) = \frac{U_{in}}{\sum_{j \in C_n} U_{jn}} = \frac{e^{\beta' x_{in}}}{\sum_{j \in C_n} e^{\beta' x_{jn}}}$$

where $C_n$ is the choice set available to decision maker n, and U is the utility for a given option. The further developed equation on the right represents a limited case in which the utility is assumed to be a linear combination of parameters and the error terms follow a logistic distribution (which has slightly fatter tails than normal). This equation is the basis for a multinomial logit model.

The main assumption for the discrete choice models to be valid are that (1) the individual decision maker's utilities are independent from irrelevant alternatives (IIA), and (2) the random components of the utilities (the error terms) are independently and identically distributed (IID), often following an assumption of a normal or logit distribution.

For the IIA assumption, an individual decision-maker needs to be indifferent to the addition of irrelevant choices to the set. For example, if a person is given a choice between a car and a bus, the addition of a skateboard to the choice set should not change the outcome. In practice, people do not always behave perfectly in this way, but it is a reasonable assumption for an economic network on a large scale. When estimating across the global economy, the vast majority of other companies are obviously unrelated to a given firm that is making decisions about its customers and suppliers. For example, the addition of Titanium Metals to Microsoft's choice set when Microsoft is considering a server supplier such as Dell, Hewlett-Packard, or IBM is irrelevant. Therefore, there is no general problem with affirming the IIA assumption for an economic network.

For the IID assumption, the answer is more convoluted. The four components of randomness are:
 1. Unobserved attributes;
 2. Unobserved preference variations;
 3. Measurement errors and imperfect information; and
 4. Instrumental (or proxy) variables.

From an economic standpoint, little is known about the decision-making process for each customer and supplier, meaning that there is a high level of unobserved taste variation. A subset of company preferences is provided by those companies required to report information to their government regulator, but the overall patterns of unobservable attributes are arguably similar because most companies simply do not disclose much. Moreover, many of these unobserved issues would be present for the actual decision-makers, as well—not just unobserved to the modeler. Finally, it is likely that some corrections would need to be made for highly correlated options (similar to comparing a red bus versus a blue bus) in which potential suppliers or customers were largely indistinguishable to their counterparts (as is true in perfect competition for commodities). As a consequence, the practical decision-making process is most likely reduced to a subset of distinct options that have very large random components from categories 1 and 2, but it would arguably be a mistake to assume that the distribution of this randomness would be independent and identical. It is possible that the level of randomness and unobserved data is so high that it approaches a normal distribution through the central limit theorem, but this is not a strong conclusion. Ultimately, this forces one to most likely reject the IID assumption given the limited observable data, but one cannot confidently reject the underlying possibility that a multinomial model is valid were more information to be discovered.

In the end, viewing the economic network through the lens of discrete choice models leads to a conclusion that a multinomial distribution is appropriate for customer-supplier decisions because the IIA assumption holds, although constructing a usable multinomial logit model would be impossible due to the violated IID assumption and lack of observable data. In other words, we surmise that entities choose customers and suppliers from a choice set based on utilities, but we do not know the exact model because too much is unobservable. Nevertheless, it does seem reasonable that the underlying decision-making process would ultimately fit a multinomial logit model if more information about attributes and preferences were available. Multinomial logit models have been used extensively in other models of consumer choice, so it is likely that the choice of customers or suppliers is not dissimilar from other choices individual consumers make in an economic context. This conclusion allows use of the probabilistic inversion algorithms (e.g., IPF or PARFUM) as a maximum likelihood estimator for log-linear models (of which multinomial logit models are a subset).

Consequently, the best approach to estimating the unknown values in the network is to provide a reasonable guess as to a local seed value based on business logic and/or probabilistic group-level relationships, and then use an iterative proportional fitting procedure that will guarantee that any converged solution is the maximum likelihood estimator of the observed data. Ultimately, this assures us that the converged solution is the best fit given the available data under the assumption of a multinomial distribution (or any other, or more generic, log-linear model).

With regard to estimating seed values, the first step in completing the economic matrix is to determine a reasonable estimate for a known relationship with an unknown value. This can range from using simple formulas to more complex statistical methods that leverage probabilities or dimensions across the network. Although the convergence of the iterative algorithms is typically not sensitive to seed values (any sufficient number of non-zero positive numbers will work), a more proportionally accurate seed will generally result in a more accurate solution. Thus, it is useful to include all information that may be relevant for the seed value.

As a simple example, a straightforward way to estimate an unknown value is to subtract the known values from the target revenue and cost totals (including an estimate of consumer and labor contributions), and evenly apportion the remaining amount over the unknown values, subject to a 10% revenue threshold (per SEC requirements) or a similar cost threshold (typically assumed to be 5-10%). Therefore, a reasonable seed value estimate for known connections missing revenues information could be:

$$e^0_{i,unk} = \max\left(\min\left(\frac{x_{i+} - c(i) - \sum_{k=1}^{n} e^0_{ik}}{n_{unknown}}, 10\% \cdot x_{i+}\right), 0\right)$$

The above equation evenly spreads the missing revenue amongst the known connections with unknown values after accounting for a typical share of revenues that comes from consumers and values already allocated, and finishes by adding a cap of 10% of revenue and a floor of 0%. The consumer share is based on the sector average and standard deviation of the observed data on supplier shares, with the remainder being allocated to consumers. A similar equation is used for the cost estimate:

$$e^0_{unk,j} = \max\left(\min\left(\frac{x_{+j} - c(j) - \sum_{k=1}^{n} e^0_{kj}}{n_{unknown}}, 10\% \cdot x_{+j}\right), 0\right)$$

Similarly, this equation spreads the missing cost evenly amongst the known connections with unknown values, again with a cap of 10% of cost, and includes an estimate of labor costs for each sector based on US Bureau of Economic Analysis data that addresses labor content by industry. Finally, to complete the seed estimation, these two separate values for missing revenue and missing cost could be averaged or the maximum could be taken for the seed value.

For both of the above equations, it would be relatively straightforward to replace the consumer and labor shares with more specific samples of individual companies that could be representative examples of their industries. This would allow the use of more granular financial data to estimate the portion of each cost and revenue category that is inbound from or outbound to outside the firm.

A more complex example of estimating seed values can use aggregated probabilities across the network, since it is likely that recent relationships across groups of companies are likely to hold moving forward for a small time increment. Each network estimate is typically being done to represent a small slice of time, so it is unlikely that the base requirements of an industry, such as the proportion of revenue received by one industry from another, would move significantly. Rather, these aggregated relationships will reflect the stability of revenue and cost patterns at an industrial level, such as semiconductor firms selling to telecom providers, or retailers selling to consumers. These higher-level relationships can then be used to narrow down the seed value for each given relationship at each time.

The more complicated seed estimate example first reduces the matrix of known values to a sector-by-sector matrix by grouping the rows and columns by their weighted industrial attributes, then allowing the relationships between sectors to provide a better guide than simple equal apportionment of unallocated amounts. The primary complication in this process is that most companies participate in more than one sector, therefore requiring, the estimation to cover all sector pairs for each pair of companies. That would follow these equations for each company pair:

$$e^0_{i,unk} = \frac{\sum_{k=1}^{m}\sum_{l=1}^{n} w_{sk} \cdot w_{cl} \cdot v_{kl}}{\sum_{k=1}^{m} w_{sk} \cdot v_{k+}} \cdot x_{i+}$$

$$e^0_{unk,j} = \frac{\sum_{k=1}^{m}\sum_{i=1}^{n} w_{sk} \cdot w_{cl} \cdot v_{kl}}{\sum_{l=1}^{n} w_{cl} \cdot v_{+l}} \cdot x_{+j}$$

These equations allocate values to an individual company pair based on the weighted sector relationships between them. A similar approach could be used to incorporate other attributes as well (such as geographies, end markets, products, channels, operating segments, etc.), and this would be essentially required if pursuing a higher-dimension iterative procedure. Ultimately, sectors are a good initial classification scheme because they attempt to categorize the activities of a firm, and that tends to line up well with the corresponding customer and suppliers. One potential area for improvement is to use multiple sector classification schemes, or to vary the level of sector granularity for the estimates. In practice, data constraints often require the use of the simplified flat allocation when sector information is incomplete or inadequate.

Once values are estimated for the known relationships, an allowance is made for unknown relationships by assigning every possible interaction a small token value to ensure their positivity. When the iterative procedure is performed, value will accrue into companies for which there is no recorded relationship. Upon convergence, these values are summed and moved to the consumer/labor category as a catch-all for unknown quantities. Although it is possible that the unknown values could accrue to the correct unknown relationships, it is not guaranteed, and the chance of a false positive is very high. Thus, the best solution is to apply them to the general category for discovery and confirmation later.

Similarly, unknown companies in the economy are implicitly lumped into the consumer/labor category as an unknown entity. Although allowances can be made for the activity in unknown relationships of known companies, it remains impossible to estimate any values for (or the existence of) unknown entities. However, when they are discovered and added to the database, the estimation procedure will incorporate them fluidly.

With regard to converging a matrix with a completed set of known and seed values for the matrix, the example of the two-dimensional iterative proportional fitting procedure is straightforward. With each iteration and until the convergence threshold is reached, the process follows these two equations:

$$\text{Step 1: } e_{ij}^{2n-1} = \frac{e_{ij} \cdot x_{i+}}{\sum_{k=1}^{J} e_{ik}}$$

$$\text{Step 2: } e_{ij}^{2n} = \frac{e_{ij} \cdot x_{+j}}{\sum_{k=1}^{I} e_{kj}}$$

where $x_{i+}$ represents the marginal row total, $x_{+j}$ is the marginal column total, and $e_{ij}$ is the interior estimate. These two steps leave the marginal totals of the rows and the columns unchanged while alternately applying marginal products until the matrix converges. Overall, the iterative proportional fitting process is computationally fast, stable, and simple. In an economic setting, the requirements for convergence are few:
1. Seed values are positive;
2. Marginal targets are positive; and
3. Sum of row marginal targets equals sum of column marginal targets.

Since the method places a small positive number in each empty cell to account for unknown relationships and uses revenue and cost totals as the marginal targets, the IPF algorithm will converge in all cases as long as the consumer/labor entity provides the balancing flows to offset the profit of the other entities. The convergence criterion is the absolute difference between the row and column totals and their respective target values. Upon convergence, final checks are performed to ensure that the estimated values do not cross preset reporting requirement limits, and the excess funds are accrued to the consumer/labor category as appropriate.

Given the realities of the data set, a few additional steps are taken to make sure that the converged result reflects the best guess given known and unknown information. The extra steps basically handle the known values for relationships that were reported to the government regulators, which are held fixed in the iterative process. Mathematically, these values are held fixed by setting a known cell to zero, removing that value from the row and column targets, proceeding according to the IPF algorithm, and then replacing the known value after convergence to the modified targets.

To illustrate the process, a basic starting matrix is shown in FIG. 2. The next step in the estimation process is to prepare the matrix for the iterative proportional fitting algorithm by inserting the seed values for the known relationships without values, inserting the small positive value to handle unknown relationships (including self-consumption in this case), and zeroing the fixed values and reducing the corresponding revenue and cost target. The intermediate matrix follows, as illustrated in FIG. 3.

Finally, the IPF algorithm can proceed to converge to the modified row and column targets. After convergence, the fixed values can be restored and the value accumulated in the unknown relationships can be moved to the consumer/labor entity. FIG. 4 illustrates a final matrix with all cleanup operations complete. As shown, the consumer and labor totals diverge from their targets when the unknown values are migrated over, reflecting the amount of undocumented economic activity. In the example illustrated in FIG. 3, 34 units of unknown activity had to be reassigned to the consumer/labor supply.

The final matrix illustrated in FIG. 4 represents the maximum likelihood estimator for the economic network given the observed data, and it is ready to be used for analytics such as centrality measures, eigenvector calculations, Markov chains, etc. in either full absolute or probabilistic form.

Figure 7:
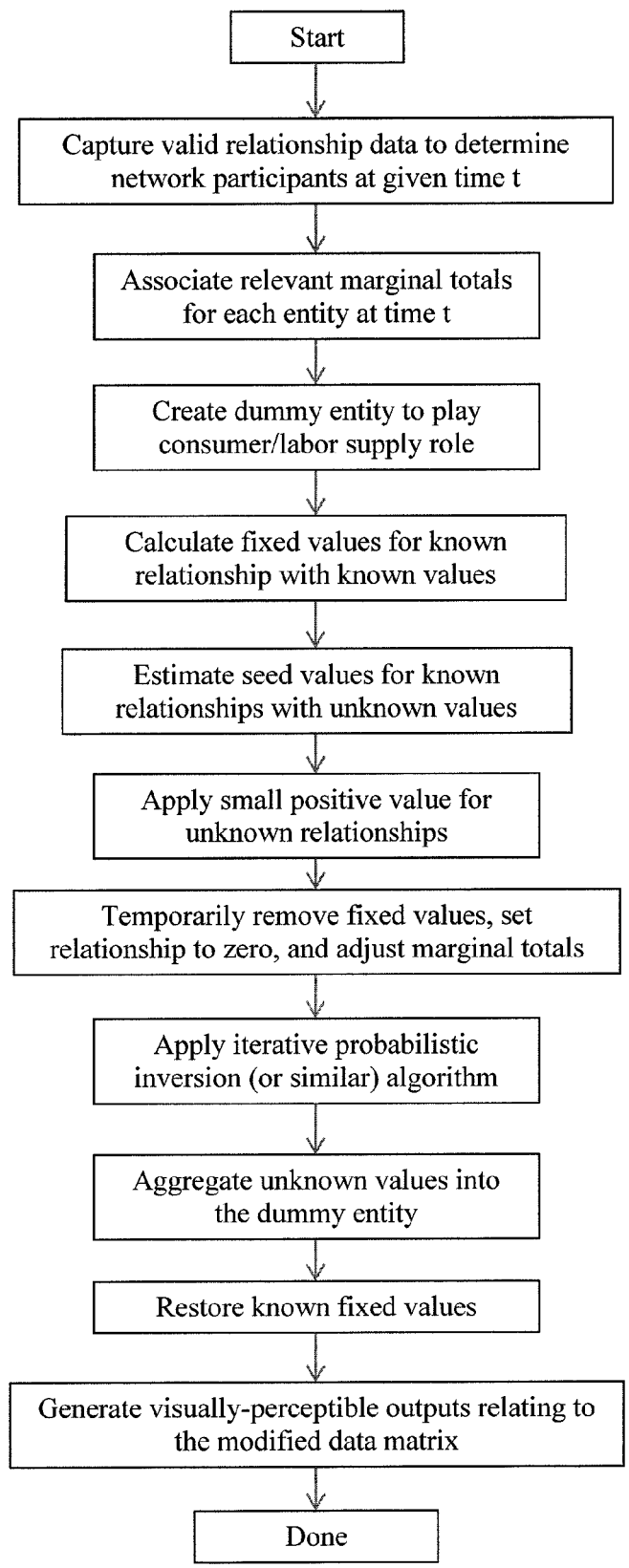
FIG. 7 illustrates a conceptual flowchart of a method that is consistent with an embodiment of the present invention.

FIG. 7 provides a conceptual flowchart of a method which is consistent with the embodiment of the present invention described hereinabove, and is self-explanatory in light of the above description. As shown in the last bubble of the flowchart, once the data has been fully processed, visually-perceptible outputs can be generated. More specifically, once the matrix has been populated using known values contained in the data, and then subsequently more fully populated using estimations, the final matrix is stored in a searchable database. Thereafter, data calls are makeable to provide one or more visually-perceptible outputs (such as a display on a computer screen, a display on a mobile device, or a printout on paper). The output can take the form of, for example, one or more sparse matrixes or one or more graphs relating to the data (both known and estimated in accordance with the present invention).

As a note, modified techniques have been developed to use iterative proportional fitting when some of the internal matrix values are negative, but those have not been covered here because it is simple to treat all economic flows as positive numbers. Moreover, it is not strictly necessary to handle negative values when seeking to estimate a base matrix that represents the level of interaction between entities. In a static snapshot at a given time, entities are either related in some way (value>0) or they are not (value=0). More complicated weightings can be applied after the base matrix is estimated, and this will have a meaningful effect on any analytics performed on the matrix. Some sample weightings are gross profit percentages, WACC discount rates, or revenue multiples, all of which can be applied to the flows in order to reflect some measure of quality or predicted growth. In addition, custom scenarios or analyst test cases can be run through the application of simple weights that represent the desired change. Applying weightings afterwards allows for further differentiation in the matrix, since the flows represent more than just the dollar transfer between companies and now include some measure of the value added by the receiving company or risk in the flow received.

An embodiment of the present invention provides a method for estimating the remaining internal values on an economic relationship matrix given partial advance knowledge of relationships and their strength. The method places very few restrictions on its use, since it only requires that the general assumptions of any log-linear model be valid and does not require the development of a specific model to guarantee that the final values are the maximum likelihood estimator. Thus, matrices can be estimated at nearly any level of resolution or scope, resulting in a best-case estimate for analyzing the economic activity under consideration. Preferably, the algorithm that is employed in connection with the present invention is configured to take into account numerous types of data, such as but not limited to: qualified and unqualified relationships between entities; financial statements, accounting or industry types, financials by division, geography, market, product, or channel, and a variety of industry specific data. Finally, the convergence process should be a probabilistic inversion procedure (e.g., iterative proportional fitting (IPF) or parameter fitting for uncertain models (PARFUM), or similar) that can guarantee the outcome to be the maximum likelihood estimate given the underlying data.

While embodiments of the present invention have been shown and described, it is envisioned that those skilled in the art may devise various modifications of the present invention without departing from the spirit and scope of the appended claims.

The invention claimed is:

1. A method implemented on a computer in relation to a database, the method comprising:
   estimating the amount of activity between a first entity and a second entity, wherein the first entity is a customer and the second entity is a supplier in an exchange of goods, services, information, or monies, and wherein (i) individual customer-supplier activity amounts are derived from a measured total of inbound and outbound flows of the first and second entity in two or more dimensions, (ii) at least some portion of the measured total inbound and outbound flows are aggregates of more than one customer-supplier relationship, and (iii) there is a non-trivial probabilistic or statistical method that can produce estimated seed values for inbound or outbound distribution of activity flows for the first and second entity to other customers or suppliers, the estimation performed by one or more processors of the computer by:
   a. computing a plurality of measured total inbound and outbound flows for the first and second entity by the two or more dimensions based on data collected from a plurality of sources, said data relating to relationships between a plurality of entities, wherein the plurality of sources includes 10-K's, 10-Q's, press releases, company presentations, websites, interviews, and analyst estimates;
   b. creating a database-stored network map of customer-supplier relationships between the plurality of entities sufficient to relate the measured totals to individual customer-supplier pairs, and also sufficient to develop an approximate representation of the economic subset of interest;
   c. creating a placeholder entity to perform the role of consumer, labor market, profit balancer, and any unknown entities in the database-stored network map;
   d. utilizing a plurality of known customer-supplier pair activity amounts from the plurality of sources, as subject to involuntary or voluntary reporting requirements to estimate at least one seed estimate for each unknown customer-supplier activity value, using the probabilistic or statistical method based on a number of connections remaining in the database-stored network map, historical relationships between groups of entities in the plurality of entities, and known logical constraints; and
   e. using the at least one seed estimate to update values in the database-stored network map, so that the network map includes all known values and estimates regarding transactions that never actually occurred and stored in the database-stored network map.

2. The method of claim 1, further comprising using one or more processors of the computer to perform the steps of:
   a. making an initial estimate of each unknown economic activity using the estimation methods outlined in (a) through (e) of claim 1;
   b. removing the known values from internal customer-supplier pairs and their contribution to the aggregated totals, and temporarily zeroing those relationships in the database-stored network map;
   c. placing an additional allowance for unknown relationships at each intersection in the database-stored network map that has an unknown relationship;
   d. converging the estimates through the use of a probabilistic inversion method that guarantees the outcome to be a maximum likelihood estimate;
   e. aggregating the allowances for unknown relationships into the placeholder entity or entities;
   f. restoring the known values and relationships and their contribution to the aggregated totals; and
   g. generating visually perceptible output based on the updated database-stored network map.

3. A method implemented on a computer in relation to a database comprising using one or more processors of the computer to perform the steps of:
   populating a database-stored network map relating to economic activity between a plurality of entities by:
   collecting data from a plurality of sources, said data relating to relationships between the plurality of entities, wherein the plurality of sources includes 10-K's, 10-Q's, press releases, company presentations, websites, interviews, and analyst estimates;
   analyzing the data to identify known and unknown entities, known and unknown relationships between known entities and known and unknown economic activities between the known relationships;
   updating the database-stored network with the known entities, and known values corresponding to the known relationships between the known entities;
   creating one or more placeholder entities to perform the role of consumer, labor market, profit balancer, and any unknown entities in the database-stored network map;
   estimating unknown relationships and unknown values relating to the data to provide estimations regarding transactions that never actually occurred and stored in the database-stored network map;
   updating the database-stored network map by replacing the unknown values with estimation values; and
   generating visually perceptible output based on the updated database-stored network map.

4. A method as recited in claim 3, wherein the step of collecting data comprises collecting data from both public and private sources.

5. A method as recited in claim 3, wherein the step of estimating comprises using at least one statistical model.

6. A method as recited in claim 3, further comprising calculating seed values for known relationships with unknown values, and updating the database-stored network map with the seed values.

7. A method as recited in claim 6, wherein the step of calculating seed values comprises determining reasonable estimates by subtracting known values in the database-stored network map from target values and evenly apportioning remaining amounts over unknown values in the database-stored network map, subject to at least one pre-determined threshold.

8. A method as recited in claim 7, wherein the step of calculating seed values comprises the use of aggregated probabilities in the database-stored network map.

9. A method as recited in claim 8, wherein the step of using aggregated probabilities comprises grouping data by weighted attributes or dimensions.

10. A method as recited in claim 3, further comprising storing the updated database-stored network map in a searchable database.

11. A method as recited in claim 3, further comprising updating database-stored network map by assigning small positive numbers to unknown relationships.

12. A method as recited in claim 3, further comprising using the data to populate a matrix with regard to known entities and known relationships, calculating and inserting seed values into the matrix with regard to known relationships with unknown values, and inserting small positive values in the matrix to account for unknown relationships.

13. A method as recited in claim 12, further comprising zeroing fixed values, reducing marginal dimensional targets, converging modified values, restoring fixed values, and assigning at least one value to the placeholder entity.

14. A method as recited in claim 3, wherein the step of collecting data comprises collecting data relating to qualified and unqualified relationships between entities using financial statements of the plurality of entities by division, geography, market, product, or channel.

15. A method as recited in claim 3, wherein the step of estimating unknown relationships and unknown values relating to the data comprises using a plurality of types of data as input in the estimation.

16. A method as recited in claim 3, further comprising using the updated database-stored network map to generate at least one of a matrix and a graph on at least one of a computer screen, a screen of a mobile device and paper.

* * * * *